United States Patent
Mickeleit et al.

(10) Patent No.: US 9,122,426 B2
(45) Date of Patent: Sep. 1, 2015

(54) METHOD AND ARRANGEMENT FOR DETECTING PRINTERS, A CORRESPONDING COMPUTER PROGRAM, AND A CORRESPONDING COMPUTER-READABLE STORAGE MEDIUM

(75) Inventors: Carsten Mickeleit, Berlin (DE); Bernd Trappe, Birkenstein (DE); Martin Komischke, Berlin (DE); Thomas Weese, Berlin (DE)

(73) Assignee: Cortado AG, Berlin (DE)

( * ) Notice: Subject to any disclaimer, the term of this patent is extended or adjusted under 35 U.S.C. 154(b) by 185 days.

(21) Appl. No.: 13/201,002

(22) PCT Filed: Feb. 12, 2010

(86) PCT No.: PCT/EP2010/051813
§ 371 (c)(1), (2), (4) Date: Oct. 14, 2011

(87) PCT Pub. No.: WO2010/092161
PCT Pub. Date: Aug. 19, 2010

(65) Prior Publication Data
US 2012/0019864 A1 Jan. 26, 2012

(30) Foreign Application Priority Data
Feb. 13, 2009 (DE) .......... 10 2009 009 445

(51) Int. Cl.
*G06F 3/12* (2006.01)

(52) U.S. Cl.
CPC ............ *G06F 3/1204* (2013.01); *G06F 3/1224* (2013.01); *G06F 3/1236* (2013.01); *G06F 3/1292* (2013.01); *G06F 3/1226* (2013.01); *G06F 3/1229* (2013.01)

(58) Field of Classification Search
USPC .............................. 358/1.15, 1.13
See application file for complete search history.

(56) References Cited

U.S. PATENT DOCUMENTS

| 2003/0078965 A1 | 4/2003 | Cocotis |
| 2005/0012951 A1 | 1/2005 | Madril |

(Continued)

FOREIGN PATENT DOCUMENTS

EP 1 460 529 A 9/2004

OTHER PUBLICATIONS

English Translation International Search Report Dated May 26, 2010.

*Primary Examiner* — Qian Yang
(74) *Attorney, Agent, or Firm* — Norris McLaughlin & Marcus, P.A.

(57) ABSTRACT

The invention relates to a method and to an arrangement for detecting printers that can be used by means of a wireless connection, a corresponding computer program, and a corresponding computer-readable storage medium that can be used in particular for printing in WLAN or Bluetooth environments.

For this purpose, in order to detect printers that can be used from a data processing device by means of a wireless communication connection, it is proposed that the following steps be performed: performing a search for a printer (200) that provides an interface to a wireless network (1100), associating found printers (200) with registered printers and/or printer drivers, detecting installed printer drivers for associated printers, generating a list (800) of printers (210) that can be used by the terminal, wherein a found printer (200) for which an installed printer driver was detected is considered to be a usable printer (210).

16 Claims, 2 Drawing Sheets

(56) References Cited

U.S. PATENT DOCUMENTS

| | | |
|---|---|---|
| 2005/0044479 A1 | 2/2005 | Williams |
| 2007/0139662 A1 | 6/2007 | Eom et al. |
| 2008/0079975 A1* | 4/2008 | Ferlitsch et al. ............ 358/1.13 |
| 2008/0184162 A1 | 7/2008 | Lindsey et al. |
| 2009/0033976 A1 | 2/2009 | Ding |

* cited by examiner

METHOD AND ARRANGEMENT FOR DETECTING PRINTERS, A CORRESPONDING COMPUTER PROGRAM, AND A CORRESPONDING COMPUTER-READABLE STORAGE MEDIUM

CROSS-REFERENCES TO RELATED APPLICATIONS

This application is the U.S. National Stage of International Application No. PCT/EP2010/051813, filed Feb. 12, 2010, which designated the United States and has been published as International Publication No. WO 2010/092161 and which claims the priority of German Patent Application, Serial No. 10 2009 009 445.8, filed Feb. 13, 2009, pursuant to 35 U.S.C. 119(a)-(d).

FIELD OF THE INVENTION

Invention relates to a method and an arrangement for detecting printers that can be used via a wireless connection, and a corresponding computer program, and a corresponding computer-readable storage medium, which can be used, in particular, when printing in WLAN or Bluetooth environments (WLAN=Wireless Local Area Network, Bluetooth: wireless protocol according to IEEE 802.15.1).

BACKGROUND OF THE INVENTION

Techniques for connecting printers to a computer (terminal) with cables are known for some time. Examples are IEEE-1284, Ethernet or USB. However, this is also disadvantageous when placing a device. The device must either be in close proximity to a computer, as with IEEE-1284 or USB, or at least a network connection must be available (Ethernet). If a printer is to be used with different computers, then the complexity for connecting the devices increases. Printers with an interface according to IEEE-1284 or USB are connected to a computer which then makes this printer available to the other workstations. Printers with network connection also occupy at least one terminal of the network cabling. It is impossible to print in this environment with a mobile terminal due to a lack of a common communication interface. If the mobile terminal is a laptop, then the laptop can generally be connected to the network. However, the advantage of mobility is then lost. In addition, printer drivers must be installed on this device. Other mobile terminals, such as Smartphones or PDAs, lack an interface for a wired network. Accordingly, with this scenario, these devices are still unable to use one of the existing printers. However, if this network in which the printers are installed is connected with a WLAN via a gateway, then the printers can also be used by mobile terminals.

Printers using wireless interfaces, such as Bluetooth or WLAN/Wi-Fi (Wi-Fi: alternative designation for WLAN) for connecting to a computer, are available since some time. The range of these connections extends up to several hundred meters if the stations are in a line of sight. The range is reduced when walls or objects are located between the stations. It is thus basically possible to locate computers and printers in different rooms without requiring a cable for the connection. The printer can simultaneously be used by different computers without requiring the aforementioned complexity. However, the same problem exists as with wired printers: the mobile device does not have the matching printer driver installed, and may not even be capable thereof. If the laptop is a laptop using the operating system MS Windows, MacOS, Linux and the like, a printer driver van be installed. However, this approach does not work for other mobile devices, such as Smartphones or PDAs. Due to the limited resources of these mobile devices, such as small memories or insufficient processor power, it is impossible to provide printer drivers for any combination of mobile terminal and printer. This process would also be dynamic, because new printers and new terminals require new printer drivers.

There is no general solution aside from special solutions for certain printers on certain mobile devices.

One of these solutions is the software "HP iPrint Photo" from the company HP, which enables wireless printing of images. This program, however, has several severe limitations:

Printing is limited to printers that understand a certain printer control language (PCL3).

The print size is fixed to a single format (10 cm×15 cm).

This program only runs on iPhones from the manufacturer Apple.

Aside from the aforementioned problems of limited printer selection, the program has the additional disadvantage of a small print format.

Another software "Air Photo", also developed for iPhones, uses a PC as print server. An image is selected on the mobile terminal and transmitted via WLAN to the PC which outputs the image on a connected printer. The PC with a dedicated module then becomes the print server for the iPhone. The user of the iPhone can thus not freely select the printer; in addition, every PC having the connected printer with which the image is to be printed must be in equipped advance with the special module.

It is therefore the object of the invention to provide a method and an arrangement for detecting printers which can be used from a data processing device via a wireless communication link, and a corresponding computer program and a corresponding computer-readable storage medium, which obviate the disadvantages of the conventional solutions and, in particular, detect the existing printers and present the detected printers to the user of a mobile terminal.

SUMMARY OF THE INVENTION

According to the invention, this object is attained with a method for detecting printers which can be used from a data processing device via a wireless communication link. The method includes the steps of performing with the data processing device a search for a printer which provides an interface to a wireless network, associating detected printers with registered printers and/or printer drivers, detecting installed printer drivers for the associated printers, and generating a list of printers that can be used by the data processing device. A detected printer for which an installed printer driver was detected is viewed as a usable printer. An alternative method includes the steps of specifying at least one printer which provides an interface to a wireless network, associating at least a portion of the specified printers—with registered printers and/or printer drivers, detecting installed printer drivers for the associated printers, and generating a list—of printers that can be used by the data processing device. A specified printer for which an installed printer driver was detected is viewed as a usable printer.

The invention has a particular advantage that with the method according to the invention for detecting printers, data processing devices, preferably mobile data processing devices, can be enabled to use a plurality of printers that provide an interface to a wireless network (e.g., printers with a WLAN connection). This is attained according to the invention by performing a search for available printers with such interface. Preferably, the search is performed by the data processing device after initiation by a user interaction or also automatically. Such search includes, for example, a search for printers providing an interface to a wireless network; it is unimportant for the invention if the printers themselves have an interface to wireless networks, or if this interface is realized via an additional device in communication with the printer. The printers detected during the search are matched to a list of registered printers and/or printer drivers, and if a match is detected, the found printer is associated with the associated registered printer and/or printer driver. For this purpose, a list of translations of printer names into the associated printer driver names can be used. This association can be made automatically. Because after a search query by the data processing device printers frequently return printer names that are different from the names for these printers registered in the list, at least a portion of the found printers is advantageously associated through user interaction. According to a preferred embodiment, the matching is automatically performed even if the names are different.

As an alternative to a search for printers providing an interface to a wireless network, such printer can also be specified through user input into the data processing device. Preferably, the address of the printer and a printer driver associated with the printer are specified. Preferably, the printer driver is provided by selection from the list of specified printer drivers.

Found and specified printers are treated in a similar manner in the following steps. For the steps of detecting installed printer drivers and generating a list of usable printers, the term 'found printer' can be replaced with the term 'specified printer'.

The list of registered printers and/or printer drivers can be stored on the data processing device or on another device, preferably a print server. In addition, printer drivers are detected which can actually be used for a printout, i.e., printer drivers which are installed on the data processing device itself or on a different device, preferably a print server. The detection can also be performed by a computer program installed on the data processing device or installed on the other device. In a preferred embodiment, the data processing device transmits a list of found printers to the print server which selects from this list those printer(s), for which a printer driver is available, and transmits this list to the data processing device, thereby providing a list of the usable printers on the mobile terminal. Alternatively, a list of the available printer drivers may be transmitted from the print server, which is then matched on the data processing device with the found printers, so that a list of the usable printers is then also available on the data processing device.

In an advantageous embodiment, a mediation computer is connected between the data processing device and the print server for connecting the data processing device and the print server, with the mediation computer providing a connection between the data processing device and the print server.

A list of those printers that can be used by the data processing device is compiled from the printers found during the search and for which an installed printer driver was detected; these printers can then be selected as usable printers in a print menu in a conventional manner.

The method of the invention is preferably at least partially performed automatically, so that a user of the data processing device will not notice a difference from a conventional print menu. In an advantageous embodiment, a search for available printers is conducted after the start of the printing process, and the association of the found printers with the printers and/or printer drivers registered in the list and the detection of the installed printer drivers also occurs automatically. Preferably, these steps run in the background. The user is then presented with a list of the usable printers. This list includes, for example, those printers for which an installed printer driver was detected. As mentioned before, the printer driver may be installed on the data processing device itself or on another device, preferably a print server.

If the list of the registered printers and/or printer drivers is stored on a different device, then the data processing device must at least temporarily be communicatively connected with this other device for associating and/or detecting the printers and/or printer drivers associated with a found printer. This communication link can be implemented wireless or wired.

When the user of the data processing device initiates a print order for printing a file, the file is in a preferred embodiment transmitted to a print server on which the printer driver associated with the selected printer is installed and on which the print data are generated. The file can be transmitted from the data processing device to the print server. However, the print server may also retrieve the data from a remote storage location after receiving the address of the storage location from the data processing device. The data processing device may be a stationary terminal, preferably however a mobile terminal.

The print data may be transmitted, preferably streamed, from the print server to the data processing device and forwarded from the data processing device to the usable printer. If a communication link exists between the print server and the usable printer, then the print data can also be transmitted directly from the print server to the usable printer.

An arrangement according to the invention includes at least one chip and/or processor which is/are configured such that a method for detecting printers which can be used from a data processing device via a wireless communication link can be executed, wherein the method includes the following steps:
    performing a search for printers which can be contacted by the data processing device via the wireless communication link, or specifying at least one printer (200) which provides an interface to a wireless network (1100),
    associating detected or specified printers with registered printers and/or printer drivers,
    for the associated printers, detecting installed printer drivers,
    generating a list of printers which can be used by the terminal, wherein a detected or specified printer for which an installed printer driver was detected is viewed as a usable printer.

Preferably, the arrangement includes at least one data processing device and at least one printer having an interface to a wireless network. The communication in the wireless network can be realized, for example, with a WLAN- or a Bluetooth-protocol.

The arrangement may also include a wired network which in turn includes at least one printer which is connected to the network via an at least partially wired communication link with a gateway. The gateway may be a wireless access point, for example an access point to the network.

A computer program for detecting printers enables a data processing device, after the computer program is loaded into the memory of the data processing device, to execute a method for detecting printers which can be used from a data processing device via a wireless communication link, wherein the method includes the following steps:
    performing a search for printers which can be contacted by the data processing device via the wireless communication link, or specifying at least one printer (200) which provides an interface to a wireless network (1100), associating detected or specified printers with registered printers and/or printer drivers, for the associated printers, detecting installed printer drivers, generating a list of printers that can be used by the terminal, wherein a detected or specified printer for which an installed printer driver was detected is viewed as a usable printer.

In another preferred embodiment of the invention, the computer program according to the invention has a modular configuration, wherein individual modules are installed on different data processing devices, for example a first terminal or a print server.

Advantageous embodiments contemplate additional computer programs configured to execute additional method steps or process sequences described in the written description.

Such computer programs can be provided, for example, in downloadable form (for a fee or free of charge, freely accessible or password-protected) in a data or communication network. The provided computer programs can then be used by a method, wherein a computer program according to claim 15 is downloaded from an electronic data network, for example from the Internet, to a data processing device connected to the data network.

To execute the method of the invention for detecting printers, a computer-readable storage medium can be used, on which a program is stored which enables a data processing device, after the computer program is stored in the memory of the data processing device, to execute a method for detecting printers which can be used from a data processing device via a wireless communication link, wherein the method has the following steps:

performing a search for printers which can be contacted by the data processing device via the wireless communication link, or specifying at least one printer (200) which provides an interface to a wireless network (1100), associating detected or specified printers with registered printers and/or printer drivers, for the associated printers, detecting installed printer drivers, generating a list of printers that can be used by the terminal, wherein a detected or specified printer for which an installed printer driver was detected is viewed as a usable printer.

With the invention, existing printers can de detected and offered to the user of a mobile terminal. The invention is also operational when printers from a wired network offer their services in a wireless network via a gateway. These printers are then treated in the same way as printers that have their own direct access to the WLAN.

The invention also solves the aforedescribed problems with printer drivers by providing an environment where print data are generated on a third device in a format and then forwarded to this printer via the terminal connected with the printer. For this purpose, a print server for generating print data in the different formats required for different printers is installed as a third device. This print server need not be reachable by the printer. A single print server can then be used for several print environments at different locations apart from one another. The print server therefore typically communicates only with the terminal. However, if one of the printers to be used for printing can be addressed directly from this print server, then the print data can be transmitted to the printer without being routed via the terminal.

Mobile terminals which include one of the protocols GPRS (General Packet Radio Service), WLAN, UMTS (Universal Mobile Telecommunications System) and the like are typically also capable of installing additional applications in order so as to also take advantage of these possibilities. These applications may also be fixedly installed in a terminal. However, the device is then inflexible, because the manufacturer of the device cannot take into consideration all requirements from users. These terminals may therefore suggest to the user to install additional applications. Each manufacturer of a mobile terminal therefore Offers a programming interface for updating the operating system or the preinstalled applications.

Depending on the mobile terminal, the operating system installed on the mobile terminal and the existing applications, the following modules are required:

a) Search for printers b) With operating systems on a mobile terminals having their own printer management, the newly found printers are included in this list c) Connection to the print server d) Matching the lists with found and registered printers (printer lists)

e) Exchange of files (documents) and/or print data f) A simple application enabling selection of the printer and transmission of the data to the selected printer is installed for devices which thus far have not provided print support.

The search for printers can be performed in many ways. On one hand, conventional methods for automatic detection of network services in IP networks, such as "Bonjour" developed by the company Apple, can be used. This is the most widely used protocol which is supported by almost all printers with WLAN connection. Alternatively, the protocols mDNS (Multicast Domain Name System) and UpnP (Universal Plug and Play) may be used. For printers with Bluetooth interface, the printer supplies the necessary information with the protocol "Service Discovery."

The printer names detected in this search may also deviate from the names of the printer drivers on the print server. To circumvent this problem, a list of the most frequently used printer names and printer driver is presented. This list may be stored on the mobile terminal or the print server. When a printer which is not listed in this list is to be found, the user is given the option to select a suitable printer driver. This printer can also be included in the list to avoid unnecessary user interaction during the next print order.

An additional match is performed after this match. It is now checked if and which printer drivers for the found printers are installed on the print server. Here too, the match can be performed in two ways: based on a list transmitted from the print server ahead of time, or the list of the found printers, with corrected names is transmitted to the print server which matches the names with the installed printer drivers and returns the list of the supported usable printers.

A simpler method can be used with devices that do not include any of the protocols for performing an automatic search for available printers. It is then necessary to know the address of the desired printer. For this purpose, a dialog is offered on the mobile terminal in which the address of the printer or of the printer driver is entered. Reference is hereby made to the lists of the registered printers and/or printer drivers, as described above.

A list of the usable printers is now available on the mobile terminal. These are those printers that were found and with which an installed printer driver was associated on the print server. It will be understood that this list may include only a single printer.

BRIEF DESCRIPTION OF THE DRAWING

The invention will now be described in more detail in an exemplary embodiment with reference to the figures of the drawings, which show in.

DETAILED DESCRIPTION OF PREFERRED EMBODIMENTS

The invention will now be described in more detail with particular reference to an exemplary mobile terminal 100, which searches for available printers 200 with WLAN connection and initiates a print order on a print server 300. However, the invention is not limited to this embodiment, but also includes embodiments using other protocols for wireless data transmission, or embodiments where the print order is executed on the mobile terminal 100, i.e., the print data are generated by a printer driver installed on the mobile terminal 100.

Figure 1:
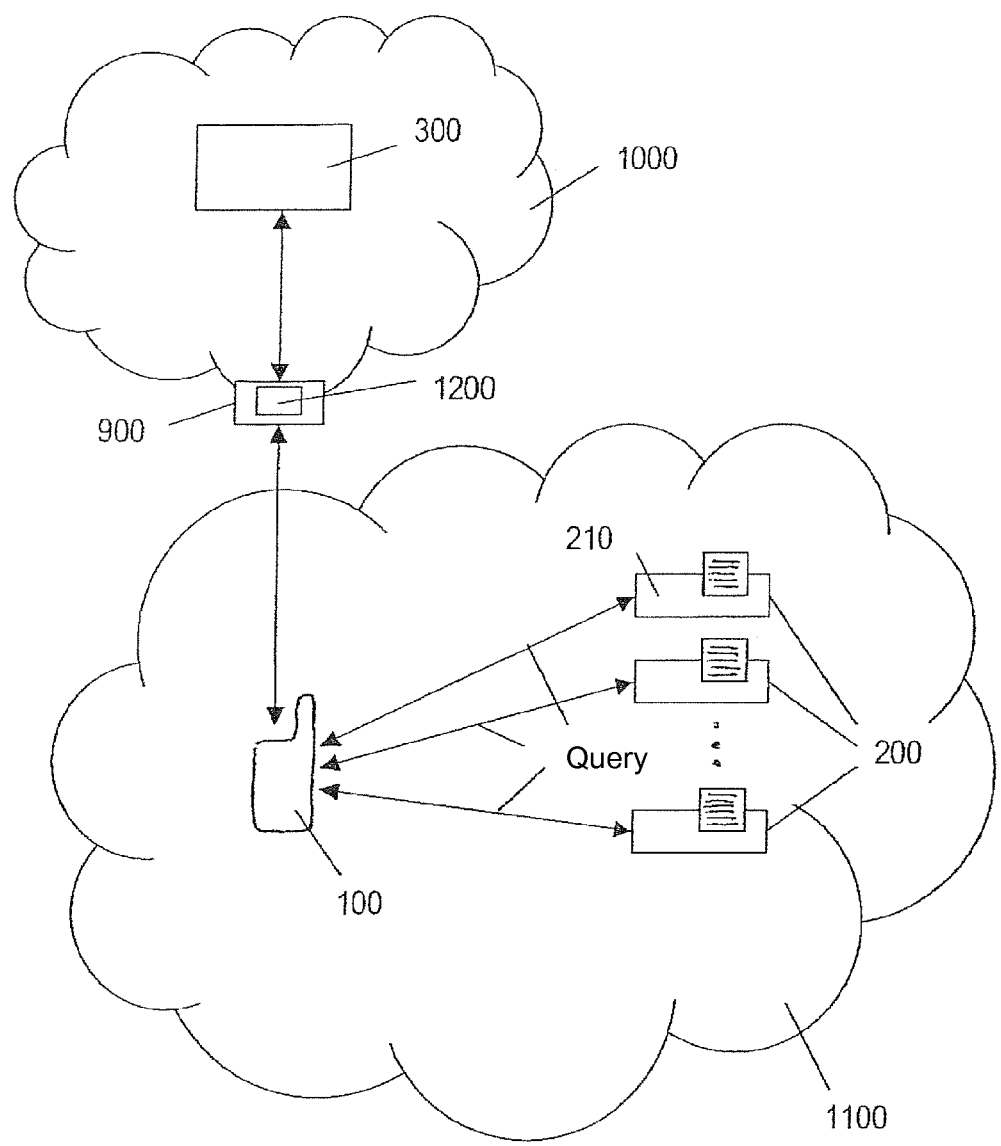
FIG. 1 a schematic diagram of an exemplary network environment for executing the method according to the invention, and FIG. 2 a schematic diagram of matching of lists.
Figure 2:
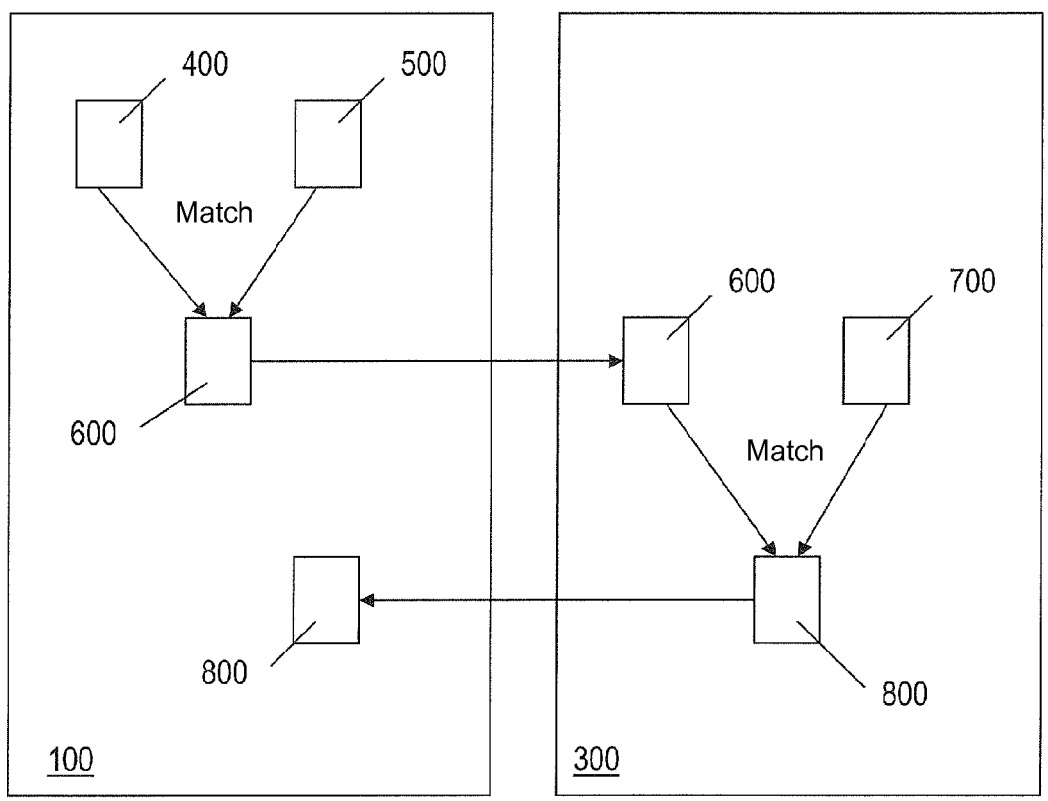

A user moves with his mobile terminal 100 to a new environment, e.g., a technician to an open-plan office (see FIG. 1). He initiates a search for available printers 200. After this search, he has a list 400 of the available printers. This list 400 is in turn matched to a list 500 of registered printer driver names (see FIG. 2). This ensures that the found printers 200 can be associated with an installed printer driver. The list 600 of the associated printers 200 and/or printer drivers can then be matched either with a list 700 obtained from the print server 300, or the list 600 of the found and associated printers 200 and/or printer drivers can be sent to the print server 300 for performing the match. In both cases, the user has thereafter a list 800 of the usable printers 210.

This not only ensures accessibility, but also that the print server 300 supports the usable printers 210. Without application of the invention, the user would be required to install the suitable printer drivers on his mobile terminal 100 after the available printers 200 were manually detected.

This is an additional advantage of the invention: the installation of printer drivers is only possible on systems which fundamentally allow this and which are powerful enough to generate print data for the printer. This is not possible when the mobile terminal is a device with limited resources, such as a mobile phone or a PDA with WLAN connection. Even if the mobile terminal were able to install and operate a printer driver, the user is confronted with an additional problem. In any new environment printers may be located for which a printer driver has not yet been installed. The user would then be required to constantly install new printer drivers, whereas the already installed printer drivers would not be used for the actual operation. The aforementioned software "HP iPrint Photo" falls into this category; only printers with a specific printer language are supported, and the software runs only on a specific device.

When using the invention, the technician now has a list 800 of the usable printers 210 for his environment. Should the technician change his location, the process is repeated, and shortly thereafter the user again has a list 800 of the usable printers 210. He is therefore no longer required to adapt his mobile terminal 100 to his environment. If he intends to print, he selects a document and a printer 200 and waits until the data are printed.

It is frequently not possible for security reasons to establish a direct external connection with a print server 300 in a LAN 1000. To nevertheless allow a connection between the print server 300 and the mobile terminal 100, even if these are located in different networks, an additional module 1200 is installed on the gateway 900 of the network 1100 in which the print server is located. The additional module 1200 responds to external connection requests and forwards this connection request to the print server 300.

Embodiments of the invention are not limited to the aforedescribed preferred exemplary embodiments. Instead, a number of variants can be contemplated that make use of the arrangement of the invention and of the method of the invention even in fundamentally entirely different embodiments.

The invention claimed is:

1. A method for detecting printers which can be used from a mobile terminal via a wireless communication link, the method comprising the steps of:
    performing, with the mobile terminal, a search for available printers which provide an interface to a wireless network and generating a list of available printers,
    matching, with the mobile terminal, the list of available printers to a list of at least one selected from registered printers and printer drivers, thereby generating a list of associated printers,
    matching the list of associated printers with a list of installed printer drivers obtained from a print server, thereby generating a list of usable printers that are usable by the mobile terminal, and
    making the list of usable printers available on the mobile terminal.

2. The method of claim 1, wherein a data processing device comprises a stationary or mobile terminal.

3. The method of claim 1, wherein the wireless network is a radio network.

4. The method of claim 1, wherein a WLAN protocol or a Bluetooth protocol is used for the wireless communication link.

5. The method of claim 1, wherein associating is performed at least one selected from automatically and through user interaction.

6. The method of claim 1, wherein information about at least one selected from the registered printers and printer drivers is provided by at least one selected from a data processing device and by a print server.

7. The method of claim 1, wherein the installed printer drivers are detected by a data processing device or by a print server.

8. The method of claim 7, and further comprising the step of generating print data on a print server when a print order is executed.

9. The method of claim 8, and further comprising the step of transmitting the print data from the print server to the data processing device and from the data processing device to a usable printer selected for printing.

10. The method of claim 8, and further comprising the step of transmitting the print data from the print server to a usable printer selected for printing.

11. The method of claim 1, wherein the interface is implemented as a wireless access point to a wired network in which the detected printer is installed.

12. An arrangement comprising a memory device and at least one selected from a chip and a processor, wherein the arrangement is configured to execute a method for detecting printers that can be used from a mobile terminal via a wireless communication link, the method comprising the steps of:

performing, with the mobile terminal, a search for available printers which provide an interface to a wireless network and generating a list of available printers, matching, with the mobile terminal, the list of available printers to a list of at least one selected from registered printers and printer drivers, thereby generating a list of associated printers, matching the list of associated printers with a list of installed printer drivers obtained from a print server, thereby generating a list of usable printers that are usable by the mobile terminal, and making the list of the usable printers available on the mobile terminal.

13. A computer program embodied on a non-transitory medium and enabling a mobile terminal, after the computer program is loaded into storage means of the mobile terminal, to execute a method for detecting printers which can be used from the mobile terminal via a wireless communication link, the method comprising the steps of:

performing, with the mobile terminal, a search for available printers which provide an interface to a wireless network and generating a list of available printers, matching, with the mobile terminal, the list of available printers to a list of at least one selected from registered printers and printer drivers, thereby generating a list of associated printers, matching the list of associated printers with a list of installed printer drivers obtained from a print server, thereby generating a list of usable printers that are usable by the mobile terminal, and making the list of the usable printers available on the mobile terminal.

14. The computer program of claim 13, wherein the computer program is downloaded from an electronic data network to the data processing device that is connectable to the data network.

15. The computer program of claim 14, wherein the electronic data network is the Internet.

16. A computer-readable non-transitory storage medium, on which a program is stored, which enables a mobile terminal, after the computer program is loaded into storage means of the mobile terminal, to execute a method for detecting printers which can be used from the mobile terminal via a wireless communication link, the method comprising the steps of:

performing, with the mobile terminal, a search for available printers which provide an interface to a wireless network and generating a list of available printers, matching, with the mobile terminal, the list of available printers to a list of at least one selected from registered printers and printer drivers, thereby generating a list of associated printers, matching the list of associated printers with a list of installed printer drivers obtained from a print server, thereby generating a list of usable printers that are usable by the mobile terminal, and making the list of the usable printers available on the mobile terminal.

* * * * *